US012681748B2

(12) United States Patent
Edwards et al.

(10) Patent No.: US 12,681,748 B2
(45) Date of Patent: Jul. 14, 2026

(54) KERNEL INFORMATION INTEGRITY INSPECTION

(71) Applicant: HEWLETT PACKARD ENTERPRISE DEVELOPMENT LP, Spring, TX (US)

(72) Inventors: Nigel John Edwards, Bristol (GB); Geoffrey Ndu, Bristol (GB); Jason Christopher Cohen, Annapolis Junction, MD (US); Theofrastos Koulouris, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 679 days.

(21) Appl. No.: 18/170,720

(22) Filed: Feb. 17, 2023

(65) Prior Publication Data
US 2024/0281272 A1 Aug. 22, 2024

(51) Int. Cl.
*G06F 9/455* (2018.01)

(52) U.S. Cl.
CPC ................... *G06F 9/45558* (2013.01); *G06F 2009/45579* (2013.01); *G06F 2009/45583* (2013.01); *G06F 2009/45591* (2013.01)

(58) Field of Classification Search
CPC ....... G06F 9/45558; G06F 2009/45579; G06F 2009/45583; G06F 2009/45591
See application file for complete search history.

(56) References Cited

U.S. PATENT DOCUMENTS

| | | | |
|---|---|---|---|
| 8,881,145 B2 | 11/2014 | Chiueh et al. | |
| 10,228,874 B2 | 3/2019 | Wysocki et al. | |
| 10,387,180 B2 | 8/2019 | Challa et al. | |
| 10,924,432 B2 | 2/2021 | Johnsen et al. | |
| 11,016,798 B2 | 5/2021 | Gopalan | |
| 2006/0206300 A1* | 9/2006 | Garg .................. | G06F 9/45537 703/27 |
| 2007/0061492 A1* | 3/2007 | van Riel ................ | H04L 69/22 710/3 |
| 2012/0284712 A1* | 11/2012 | Nimmagadda ....... | G06F 13/105 718/1 |
| 2016/0132443 A1* | 5/2016 | Davda ................ | G06F 9/45558 710/308 |
| 2016/0212174 A1* | 7/2016 | Raleigh .................. | G06Q 20/32 |
| 2018/0331900 A1* | 11/2018 | Kakaiya ................ | H04L 12/413 |

(Continued)

OTHER PUBLICATIONS

Curt Hopkins, "Quis custodiet ipsos custodes? HPE next-generation intrusion detection system, that's who" HP Labs, Apr. 2019, 5 pages.

(Continued)

*Primary Examiner* — April Y Blair

(74) *Attorney, Agent, or Firm* — Trop, Pruner & Hu, P.C.

(57) ABSTRACT

In some examples, a bus device includes a device controller to perform input/output (I/O) virtualization to provide a virtualized instance of the bus device. The device controller establishes a channel between the virtualized instance of the bus device and a guest operating system (OS) of a virtual machine (VM). The device controller receives, from the VM, address information relating to a portion of a memory containing information associated with a kernel of the guest OS, and obtains, for integrity inspection, the information associated with the kernel from the memory based on the address information.

18 Claims, 6 Drawing Sheets

(56) References Cited

U.S. PATENT DOCUMENTS

| | | | |
|---|---|---|---|
| 2019/0042329 A1 | 2/2019 | Kakaiya et al. | |
| 2020/0150997 A1 | 5/2020 | Chang et al. | |
| 2020/0159969 A1* | 5/2020 | Shanbhogue ....... | G06F 13/4282 |
| 2020/0409740 A1 | 12/2020 | Li et al. | |
| 2021/0006511 A1 | 1/2021 | Uminski et al. | |
| 2021/0149587 A1 | 5/2021 | Lukoshkov et al. | |
| 2022/0365805 A1* | 11/2022 | Chen ..................... | G06F 9/4411 |

OTHER PUBLICATIONS

Intel/Microsoft, "Open Compute Project, Scalable I/O Virtualization Revision 1.0, Version 1.2", Feb. 2022, 30 pages.
RedHat, "Hardware Considerations for Implementing SR-IOV", available online at <https://access.redhat.com/documentation/en-us/red_hat_virtualization/4.0/html/hardware_considerations_for_implementing_sr-iov/index>, 2023, 5 pages.
SRIOV, "Overview of Single Root I/O Virtualization (SR-IOV)", Mar. 2022, 1 page.

\* cited by examiner

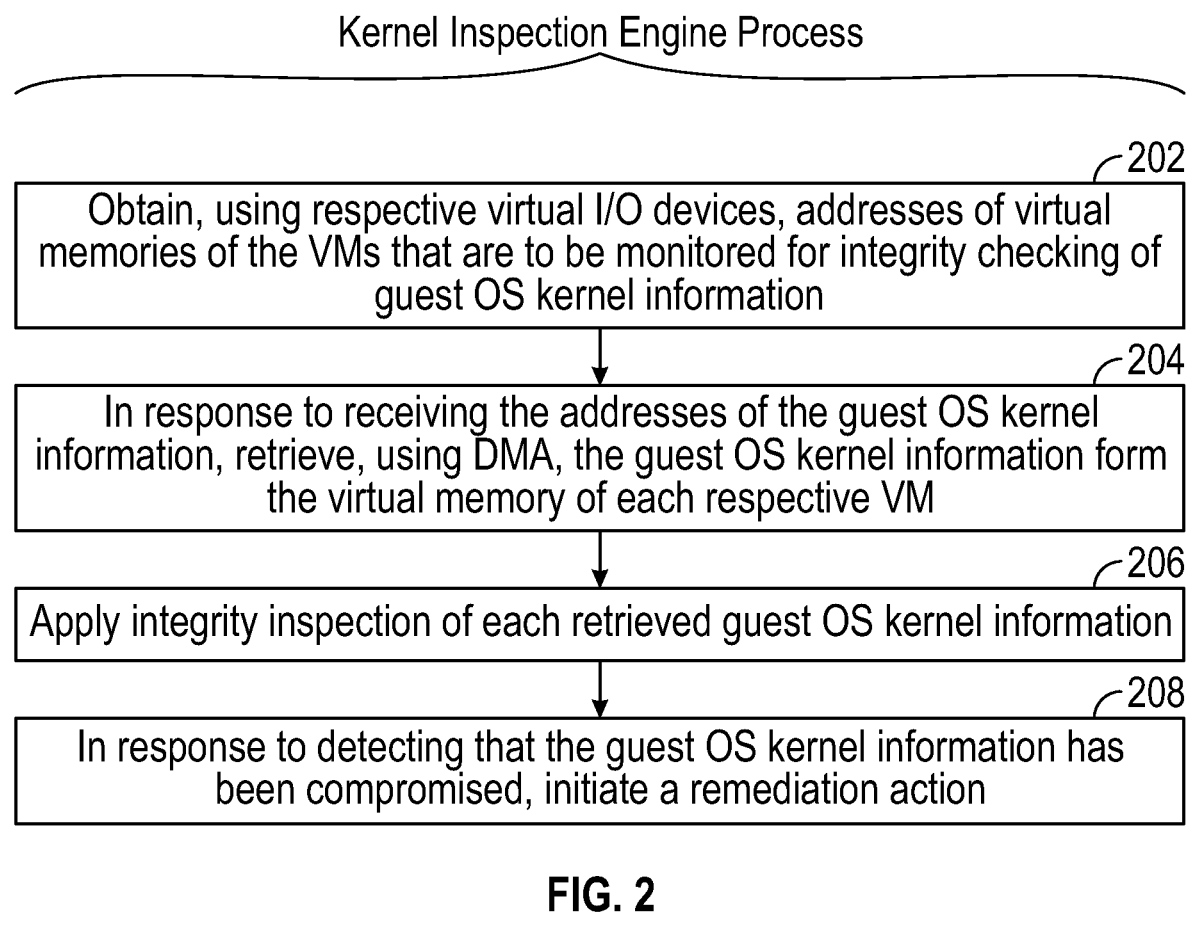

Kernel Inspection Engine Process

⌐202

Obtain, using respective virtual I/O devices, addresses of virtual memories of the VMs that are to be monitored for integrity checking of guest OS kernel information

⌐204

In response to receiving the addresses of the guest OS kernel information, retrieve, using DMA, the guest OS kernel information form the virtual memory of each respective VM

⌐206

Apply integrity inspection of each retrieved guest OS kernel information

⌐208

In response to detecting that the guest OS kernel information has been compromised, initiate a remediation action

FIG. 2

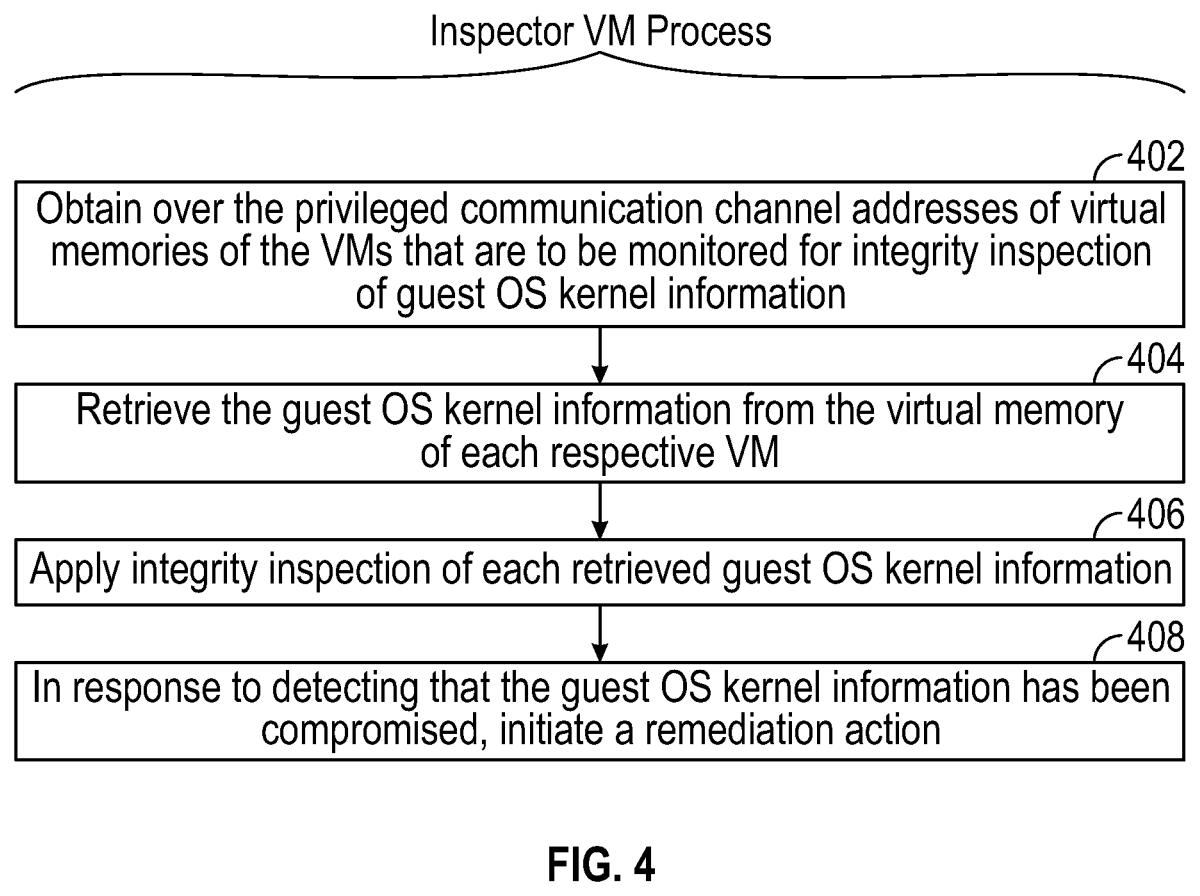

Inspector VM Process

┌─────────────────────────────────────────────────────────────────────┐ ⌐402
│ Obtain over the privileged communication channel addresses of virtual │
│ memories of the VMs that are to be monitored for integrity inspection │
│            of guest OS kernel information                              │
└─────────────────────────────────────────────────────────────────────┘

┌─────────────────────────────────────────────────────────────────────┐ ⌐404
│   Retrieve the guest OS kernel information from the virtual memory      │
│                  of each respective VM                                 │
└─────────────────────────────────────────────────────────────────────┘

┌─────────────────────────────────────────────────────────────────────┐ ⌐406
│ Apply integrity inspection of each retrieved guest OS kernel information │
└─────────────────────────────────────────────────────────────────────┘

┌─────────────────────────────────────────────────────────────────────┐ ⌐408
│ In response to detecting that the guest OS kernel information has been  │
│           compromised, initiate a remediation action                  │
└─────────────────────────────────────────────────────────────────────┘

FIG. 4

KERNEL INFORMATION INTEGRITY INSPECTION

BACKGROUND

An electronic device can include an operating system (OS) that manages resources of the electronic device. The resources include hardware resources, program resources, and other resources. The OS includes a kernel, which is the core of the OS and performs various tasks, including controlling hardware resources, arbitrating conflicts between processes relating to the resources, managing file systems, performing various services for parts of the electronic device, including other parts of the OS, and so forth.

BRIEF DESCRIPTION OF THE DRAWINGS

Some implementations of the present disclosure are described with respect to the following figures.

FIG. 2 is a flow diagram of a process of the kernel inspector device according to some examples.

FIG. 4 is a flow diagram of a process of the inspector VM according to further examples.

Figure 1:
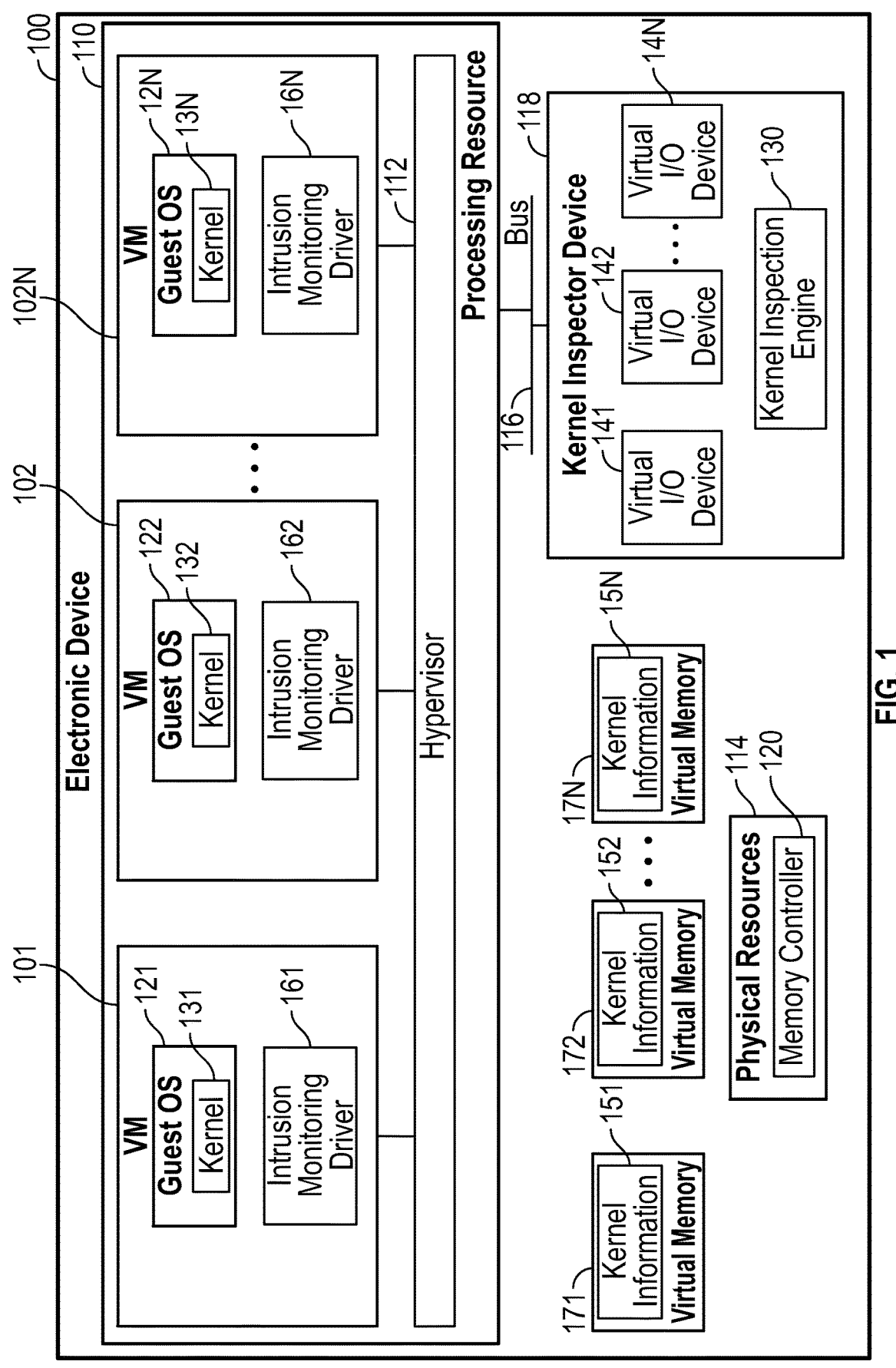
FIG. 1 is a block diagram of an electronic device that includes virtual machines (VMs) and a kernel inspector device, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Malware can compromise a kernel of an operating system (OS) by inserting malicious code into the kernel. The malicious code can be in the form of a malicious kernel module, which is referred to as a rootkit. The rootkit can hide attacker activity and can have a long-term persistent presence in the OS.

A rootkit may be used by an attacker (a human, a program, or a machine) to steal or corrupt information of an electronic device in which the rootkit resides. A rootkit may also conceal the presence of other malware. Additionally, a rootkit may compromise an electronic device in which the rootkit resides to allow an attacker to take control of the electronic device to perform malicious actions.

In some electronic devices, management controllers can be used to perform integrity inspection of OS kernels in the electronic devices. A management controller refers to one or more hardware processing circuits used to perform various management tasks with respect to an electronic device. The management controller is separate from the main processors of the electronic device. An example of the management controller is a baseboard management controller (BMC). The management controller can detect changes to a kernel that may be indicative of malicious activity. Although the management controller may be able to perform integrity inspection of a kernel in a non-virtualized system, the management controller in some examples is unable to perform integrity inspection of kernels of guest OSes in virtual machines (VMs). Without the ability to perform integrity inspection of kernels in VMs, an electronic device that includes VMs may be vulnerable to malware attacks that are able to insert rootkits into kernels of guest OSes in the VMs.

In accordance with some implementations of the present disclosure, a bus device is employed to allow for information associated with a kernel of a guest OS of a VM to be obtained for integrity inspection. In examples where an electronic device includes multiple VMs, the bus device is able to obtain information associated with kernels of guest OSes of the multiple VMs for integrity inspection. "Integrity inspection" of information associated with a kernel can refer to any checking performed with respect to the information to determine whether the kernel has been compromised, such as due to insertion of malware into the kernel by an attacker or due to any other type of corruption of the kernel.

The bus device includes a device controller that performs input/output (I/O) virtualization to provide a virtualized instance of the bus device. If there are multiple VMs to be protected, the device controller can perform the I/O virtualization to provide multiple virtualized instances of the bus device. The device controller establishes a channel between the virtualized instance of the bus device and a guest OS of the VM. The bus device receives, from the VM, address information relating to a portion of a memory containing information associated with a kernel of the guest OS, and obtains, for integrity inspection, the information associated with the kernel from the memory based on the address information. The address information can include a virtual memory address or a physical memory address. The virtualized instance of the bus device is coupled over the channel with the VM without interception or interposition by a hypervisor.

A hypervisor, which can also be referred to as a virtual machine monitor (VMM), includes machine-readable instructions that can create and run a collection of VMs in an electronic device. As used here, a "collection" of items can refer to a single item or multiple items. Thus, a collection of VMs can refer to a single VM or multiple VMs. In examples where there are multiple VMs in the electronic device, the multiple VMs can share physical resources of the electronic device.

The hypervisor virtualizes the physical resources such that virtual resources are presented to each VM for use by the VM. Examples of physical resources of the electronic device can include a processing resource (including a collection of processors), memory resources (including a collection of memory devices), storage resources (including a collection of storage devices), communication resources (e.g., including a collection of network interface controllers), and so forth.

A VM includes a guest OS, which runs within the virtualized environment of the VM rather than the physical environment of the host electronic device. Each VM of multiple VMs in the electronic device can run a respective guest OS. In some examples, guest OSes in different VMs can be of the same type or of different types. Examples of the guest OSes include any or some combination of: a Linux OS, a UNIX OS, a WINDOWS OS, a MAC OS, and so forth.

Each guest OS of a VM includes a kernel that is to be protected from being compromised, such as by malware or by another cause. If a guest OS kernel becomes compromised, then the guest OS kernel would not operate in the manner intended, which may result in errors in the electronic device, or which may allow an attacker to gain unauthorized access of the VM and the rest of the electronic device in which the VM executes.

By being able to obtain information associated with a guest OS kernel using mechanisms according to some implementations of the present disclosure, compromised guest OS kernels can be detected and remediation actions can be taken with respect to the compromised guest OS kernels to prevent unauthorized access or loss of data or other errors in an electronic device, and/or to prevent unauthorized access by an attacker in cases where the guest OS kernels were compromised by malware.

FIG. 1 is a block diagram of an electronic device 100 in which multiple VMs 101, 102, . . . , 10N (N≥2) can execute. Examples of the electronic device 100 can include any or some combination of the following: a desktop computer, a server computer, a notebook computer, a tablet computer, a smartphone, a vehicle, a household appliance, a game appliance, an Internet-of-Things (IoT) device, and so forth. Although FIG. 1 shows an example in which multiple VMs can execute in the electronic device 100, in a different example, a single VM can execute in the electronic device 100.

The VMs 101 to 10N can execute on a processing resource 110 of the electronic device 100. The processing resource 110 can include a collection of hardware processors. A hardware processor can include a microprocessor, a core of a multi-core microprocessor, a microcontroller, a programmable integrated circuit, a programmable gate array, or another hardware processing circuit.

Each of the VMs 101, 102, . . . 10N includes a respective guest OS 121, 122, . . . , 12N. Each guest OS in turn includes a respective guest OS kernel 131, 132, . . . , 13N.

The electronic device 100 further includes a hypervisor 112 that creates and manages physical resources 114 of the electronic device 100 for use by the VMs 101, 102, . . . , 10N. The hypervisor 112 can present emulated instances of the physical resources 114 that can be used by the respective VMs 101, 102, . . . , 10N.

The electronic device 100 further includes a bus 116, which is a communication channel over which electronic components of the electronic device 100 can communicate. In some examples, the bus 116 is a Peripheral Component Interconnect Express (PCIe) bus, which is a serial expansion bus for connecting electronic components of an electronic device. In other examples, the bus 116 can operate according to a different protocol, whether standardized, open-source, or proprietary. Examples of other buses that can be used in the electronic device 100 include any or some combination of the following: a Compute Express Link (CXL) bus, an InfiniBand bus, a HyperTransport bus, and so forth.

In accordance with some implementations of the present disclosure, a kernel inspector device 118 is connected to the bus 116. The kernel inspector device 118 is a bus device that is able to communicate over the bus 116. If the bus 116 is a PCIe bus, then the kernel inspector device 118 is a PCIe bus device. The kernel inspector device 118 is separate from the processing resource 110 of the electronic device 100 on which the hypervisor 112 executes. In some examples, the kernel inspector device 118 can also be separate from a management controller such as a BMC (not shown) in the electronic device 100. The BMC is also separate from the processing resource 110. In other examples, the kernel inspector device 118 can be implemented as part of the management controller such as the BMC.

The processing resource 110 that executes the VMs 101 to 10N and the hypervisor 112 is also connected to the bus 116. Although FIG. 1 shows the kernel inspector device 118 and the processing resource 110 being directly connected to the bus 116, the kernel inspector device 118 and/or the processing resource 110 may be connected through one or more intermediary devices (e.g., an input/output (I/O) hub, a bridge, etc.) to the bus 116 in other examples.

The kernel inspector device 118 can include kernel inspection engine 130 that can be implemented with any or some combination of: a microprocessor, a core of a multi-core microprocessor, a microcontroller, a programmable integrated circuit, a programmable gate array, or another hardware processing circuit. The kernel inspection engine 130 can also include machine-readable instructions (software and/or firmware) executable on the hardware processing circuit.

In accordance with some implementations of the present disclosure, the kernel inspection engine 130 can implement I/O virtualization, such as Single Root I/O Virtualization (SRIOV), Scalable I/O Virtualization (SIOV), and so forth.

SRIOV refers to a virtualization technique in which an I/O device can be virtualized and shared, which in the case of FIG. 1 can be shared by the VMs 101 to 10N. SRIOV is an extension of the PCIe protocol, and is defined by specifications provided by PCI-SIG (Special Interest Group). SRIOV provides a hardware-assisted I/O virtualization technique for partitioning an I/O device, such as the kernel inspector device 118, into virtualized instances of the kernel inspector device 118. SRIOV allows an I/O device, such as the kernel inspector device 118, to allow separate access to its resources among multiple entities, including the VMs 101 to 10N.

Hardware-assisted I/O virtualization is contrasted to software-based I/O virtualization. In an example, the hypervisor 112 provides software-based I/O virtualization, in which the hypervisor 112 emulates the physical resources 114 of the electronic device 100 and presents virtual resources to the VMs 101 to 10N. However, software-based I/O emulation of physical resources as performed by the hypervisor 112 can incur a performance overhead, since it consumes the processing resource 110 of the electronic device 100, which reduces availability of the processing resource 110 for other tasks of the electronic device 100.

The kernel inspector device 118 includes a PCIe physical function (PF), which is the primary function of the kernel inspector device 118 and which can advertise the kernel inspector device's 118 SRIOV capabilities. Additionally, one or more PCIe virtual functions (VFs) can be associated with the PF. The VFs share physical resources of the kernel inspector device 118. In accordance with some implementations of the present disclosure, the VFs of the kernel inspector device 118 implement virtual I/O devices 141, 142, . . . 14N, which are virtualized instances of the kernel inspector device 118. Each virtual I/O device 14$j$ (j=1 to N) is used by the kernel inspection engine 130 to interact with a respective VM 10$j$.

More specifically, each virtual I/O device 14$i$ can establish a communication channel with the respective VM 10$j$. The communication channel that is established is a virtual channel between virtual entities, which include the virtual I/O device 14$i$ and the VM 10$j$. For enhanced security, data communicated over the communication channel between each virtual I/O device 14*i* and the respective VM 10*j* can be encrypted to prevent another entity from accessing the communicated data.

In other examples, SIOV can be used instead of SRIOV. SIOV also provides hardware-assisted I/O virtualization, and supports a greater quantity of VMs. SIOV is defined by specifications from the Open Compute Project (OCP).

The hypervisor 112 also supports SRIOV or SIOV to allow virtualized instances of the kernel inspector device 118 to directly interact with respective VMs (e.g., by bypassing the hypervisor 112). Although reference is made to SRIOV and SIOV as examples of I/O virtualization that can be performed by the kernel inspector device 118, other types of I/O virtualization can be employed in other examples to allow the kernel inspector device 118 to appear as multiple devices to corresponding VMs. Generally, I/O virtualization performed by the kernel inspector device 118 bypasses the hypervisor 112 such that a virtualized instance of the kernel inspector device 118 can interact with a respective VM to obtain kernel information with respect to the VM without being intercepted by the hypervisor 112.

By using I/O virtualization such as SRIOV or SIOV at the kernel inspector device 118, the virtual I/O devices 141 to 14N of the kernel inspector device are able to communicate with respective the VMs 101 to 10N over corresponding communication channels without the communications being intercepted by the hypervisor 112. In other words, communication of information between a virtual I/O device 14*i* of the kernel inspector device 118 and a corresponding VM 10*j* can occur without passing through the hypervisor 112, such that the interaction between the virtual I/O device 14*i* and the corresponding VM 10*j* can occur without interception or interposition of the hypervisor 112. This prevents the hypervisor 112 (which may be subject to compromise) from snooping communications associated with integrity inspection of the respective guest OS kernel 13*j* between the kernel inspector device 118 and each corresponding VM 10*j*.

Each VM stores kernel information associated with the guest OS kernel that is part of the VM. For example, the VM 101 stores kernel information 151 related to the guest OS kernel 131 in the VM 101, the VM 102 stores kernel information 152 that is associated with the guest OS kernel 132, and the VM 10N stores kernel information 15N associated with the guest OS kernel 13N.

The kernel information of the respective VM can be stored in a virtual memory of the respective VM. For example, the kernel information 151 is stored in a virtual memory 171 of the VM 101, the kernel information 152 is stored in a virtual memory 172 of the VM 102, and the kernel information 15N is stored in a virtual memory 17N of the VM 10N. A virtual memory is a virtualized instance of a physical memory in the electronic device 100 that is presented by the hypervisor 112 to a VM.

Examples of kernel information can include any or some combination of the following: the program code (machine-readable instructions) of the guest OS kernel; a list of kernel modules that are used by the guest OS kernel to perform various functions, where a kernel module includes machine-readable instructions; read-only data that is used by the guest OS kernel, and so forth. Typically, the kernel information associated with a guest OS kernel should remain static during operation of a VM, where an operation of the VM can include booting the VM or a runtime operation of the VM after the VM has been booted.

Any modification of the kernel information can be an indication that the kernel information has been compromised, and thus, the guest OS kernel associated with the kernel information has been compromised. The kernel information may be compromised by malware or by another cause (e.g., corruption of the VM or data errors experienced during execution of the kernel).

In accordance with some implementations of the present disclosure, each VM 101 to 10N can selectively enable or disable the ability of an external entity, such as the kernel inspector device 118, to monitor the VM for compromise. The enabling or disabling of the external monitoring can be performed with an intrusion monitoring driver in each VM. The VM 101, 102, . . . , 10N include respective intrusion monitoring drivers 161, 162, . . . , 16N. A "driver" refers to machine-readable instructions that are designated to interact with a specific hardware device. Although shown as separate from the guest OSes in FIG. 1, it is noted that the intrusion monitoring drivers 161, 162, . . . , 16N can be part of corresponding guest OSes 121, 122, . . . , 12N in other examples.

If the intrusion monitoring driver 16*j* (j=1 to N) is not installed or is disabled in the respective VM 10*j*, then external monitoring of the VM 10*j* would not be enabled. In other words, the kernel inspector device 118 would not be able to monitor the kernel information 15*j* of the VM 10*j* if the intrusion monitoring driver 16*j* is not installed or is disabled in the VM 10*j*.

The intrusion monitoring driver 16*j* is installed in the respective VM 10*j* if program code of the intrusion monitoring driver 16*j* is loaded in the VM 10*j*. The intrusion monitoring driver 16*j* is enabled if the intrusion monitoring driver 16*j* is active and performing its intended operations.

In further examples, even if the intrusion monitoring driver 16*j* is installed or enabled in the VM 10*j*, the intrusion monitoring driver 16*j* can be configured to either enable or disable the external monitoring of the VM 10*j*. For example, a user (e.g., through a user interface) can configure the intrusion monitoring driver 16*j* to enable or disable the monitoring performed by the kernel inspector device 118. In other example, the configuring of the intrusion monitoring driver 16*j* to enable or disable the monitoring performed by the kernel inspector device 118 can be programmed by any entity (e.g., a user, a program, or a machine) that is resident in the electronic device 100 or external of the electronic device 100.

As noted above, each virtual I/O device 14*j* in the kernel inspector device 118 can establish a communication channel with the respective VM 10*j*. Using the communication channel, the virtual I/O device 14*j* is able to interact with the respective intrusion monitoring driver 16*j* in the VM 10*j* to obtain the kernel information 15*j* of the VM 10*j*. The virtual I/O device 14*j* can communicate with the intrusion monitoring driver 16*j* using a specific protocol, which can be standardized, open-source, or proprietary.

In some examples, the virtual I/O device 14*j* is able to use direct memory access (DMA) to obtain the kernel information 15*j* from the virtual memory 17*j* of the VM 10*j*. In some examples, the hypervisor 112 can enable DMA access of a VM's virtual memory, such as by setting up an I/O memory management unit (IOMMU) of the processing resource 110 when the hypervisor initializes the guest OS 12*j* in the VM 10*j*. IOMMU is a technology that connects a bus (e.g., the bus 116) to a memory, which in this case is the virtual memory 17*j* of the VM 10*j*. IOMMU can be used by the processing resource 110 to control what memory can be accessed by an I/O device (e.g., the kernel inspector device 118) on a bus (e.g., the bus 116).

Once the IOMMU is set up by the hypervisor 112 to allow the physical memory locations associated with each virtual memory 17j to be accessed by the kernel inspector device 118, the processing resource 110 can automatically and transparently handle address translations, DMA mapping, and memory encryption and decryption. In further examples, a virtual IOMMU may be provided in each VM to allow the VM to control what virtual memory may be accessed by an I/O device such as the kernel inspector device 118.

In addition to providing or enabling the intrusion monitoring driver 16j in each VM 10j to allow monitoring of the kernel information 15j, DMA access also has to be enabled (such as by the hypervisor 112) to allow the kernel inspector device 118 to access the kernel information 15j. In other words, if the intrusion monitoring driver 16j is not present or disabled, or if DMA access is not enabled, the kernel inspector device 118 would not be able to inspect the VM 10j.

FIG. 2 is a flow diagram of a process of the kernel inspection engine 130 according to some examples. The kernel inspection engine 130 obtains (at 202), using respective virtual I/O devices 141 to 14N, addresses of virtual memories (of the VMs 101 to 10N) that are to be monitored for integrity inspection of guest OS kernel information. For example, the kernel inspection engine 130 can issue requests (through the virtual I/O devices 141 to 14N) to respective intrusion monitoring drivers 161 to 16N for the addresses of the virtual memories 171 to 17N at which guest OS kernel information 151 to 15N are stored. As another example, the respective intrusion monitoring drivers 161 to 16N can push, to the kernel inspection engine 130, the addresses of the virtual memories 171 to 17N at which guest OS kernel information 151 to 15N are stored. The obtaining of the addresses of virtual memories at which guest OS kernel information 151 to 15N are stored can be performed by the kernel inspection engine 130 right after secure initialization and measured boot of each VM 10j, when it is likely that the VM 10j is still in a secure state (i.e., has not yet loaded any malware).

In response to receiving the addresses of the guest OS kernel information, the kernel inspection engine 130 retrieves (at 204), using DMA, the guest OS kernel information 15j from the virtual memory 17j of each respective VM 10j. More specifically, the kernel inspection engine 130 uses a corresponding virtual I/O device 14j to retrieve, using DMA, the guest OS kernel information 15j from the virtual memory 17j.

The kernel inspection engine 130 then applies (at 206) integrity inspection of each retrieved guest OS kernel information 15j. The integrity inspection is to confirm that the guest OS kernel information 15j has not deviated from a known good state. In some examples, the guest OS kernel information 15j can compute a cryptographic hash based on the content of a portion of the guest OS kernel information 15j. The portion of the guest OS kernel information 15j can include the entire guest OS kernel information 15j or a partial part of the guest OS kernel information 15j. The guest OS kernel information 15j can compare the cryptographic hash value derived from the portion of the guest OS kernel information 15j to a reference cryptographic hash value. If the derived cryptographic hash value does not match the reference cryptographic hash value, then that indicates that the guest OS kernel information 15j may have been compromised.

In response to detecting that the guest OS kernel information 15j has been compromised, the kernel inspection engine 130 can initiate (at 208) a remediation action. The remediation action can include any or some combination of the following: shutting down or otherwise disabling the VM

10j associated with the compromised guest OS kernel information 15j, replacing the guest OS kernel 13j with a known good version of the guest OS kernel 13j, performing a malware removal process to attempt to remove any malware from the guest OS kernel 13j, sending an alert to a target entity (e.g., a human administrator, a management program, a management machine, etc.), or any other remediation action.

In some examples, the guest OS kernel information 15j stored in the virtual memory 17j may be encrypted, such as in cases where the VM 10j is an encrypted VM. Examples of encrypted VMs include those that execute WINDOWS OS or other OSes. In other examples, the VMs are not encrypted, such as VMs that employ other types of the OSes, including Linux OS, UNIX OS, MAC OS, and so forth.

By utilizing the support by the processing resource 110 for I/O (e.g., using SRIOV or SIOV) to access the virtual memory 17j by the kernel inspector device 118, the encrypted guest OS kernel information 15j may be automatically decrypted, such as by a memory controller 120 of the electronic device 100, before the guest OS kernel information 15j is transferred to the kernel inspector device 118. This allows more efficient usage of processing resources since the kernel inspector device 118 would not have to be configured with the ability to decrypt encrypted guest OS kernel information. Note that in some cases, moving memory content (e.g., including the guest OS kernel information 15j) from one physical memory location (associated with the virtual memory 17j) to another physical memory location (associated with the kernel inspector device 118) may change the encrypted content, since the address of the memory content may be used as an input to an encryption algorithm to mitigate page substitution attacks. By using the memory controller 120 to decrypt the encrypted guest OS kernel information 15j, the encrypted guest OS kernel information 15j can be decrypted prior to moving the guest OS kernel information 15j to the kernel inspector device 118.

Figure 3:
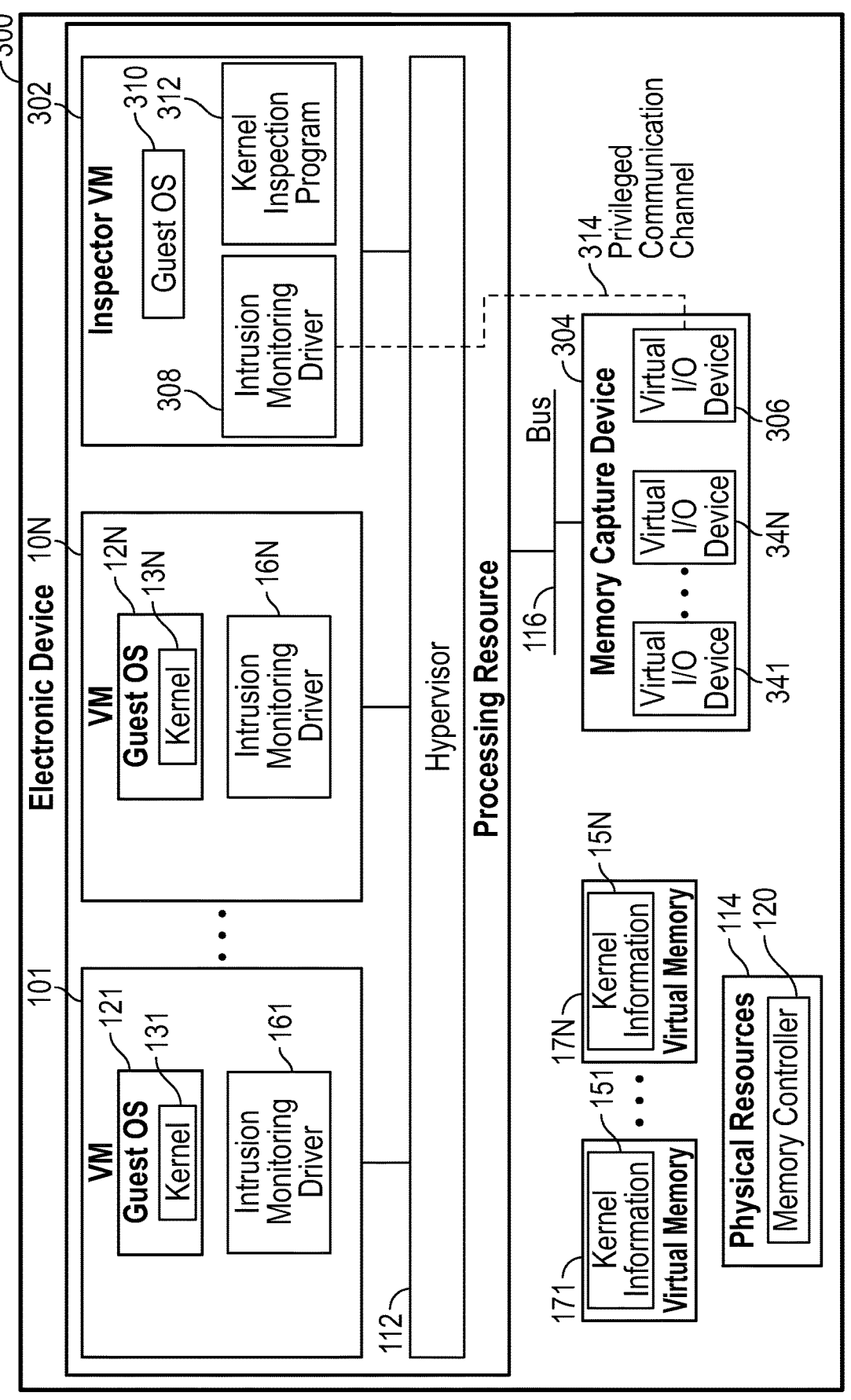
FIG. 3 is a block diagram of an electronic device that includes a kernel inspector virtual machine (VM) that uses a memory capture device, in accordance with further examples.

FIG. 3 is a block diagram of an electronic device 300 according to alternative examples of the present disclosure. The electronic device 300 includes the processing resource 110, the bus 116, and the physical resources 114.

The electronic device 300 uses an inspector VM 302 to perform integrity inspection of respective VMs 101 to 10N. The elements of the VMs 101 to 10N are similar to those depicted in FIG. 1 and are assigned the same reference numerals.

In FIG. 3, the inspector VM 302 rather than the kernel inspector device 118 is used to perform integrity inspection of guest OS kernels. In some examples, the inspector VM 302 is executed by the processing resource 110 that also executes the other VMs 101 to 10N whose guest OS kernels 131 to 13N are subject to integrity inspection by the inspector VM 302. In other examples, the inspector VM 302 is executed by a processing resource separate from the processing resource 110.

The kernel inspector device 118 of FIG. 1 has sufficient processing capacity to perform integrity inspection of guest OS kernel information, which can involve computations of cryptographic hash values and using those cryptographic hash values to determine whether the guest OS kernel information has been compromised. Computing cryptographic hash values can be processing intensive so that a relatively large capacity processing device, such as a data processing unit (DPU) or other type of processing device, would have to be used. A relatively large capacity processing device can be expensive and can add to the overall cost of an electronic device.

By performing VM guest OS kernel integrity inspection using the inspector VM 302, a relatively large capacity processing device would not have to be employed. The inspector VM 302 can use a relatively small capacity processing device to obtain guest OS kernel information 151 to 15N from the respective VMs 101 to 10N. The relatively small capacity processing device can be in the form of a memory capture device 304 in place of the kernel inspector device 118 of FIG. 1. The memory capture device 304 is a bus device connected to the bus 116 (e.g., a PCIe bus). The memory capture device 304 can be implemented with a microcontroller or other hardware processing device that has less processing capacity than the kernel inspector device 118. As a result, the hardware cost associated with performing integrity inspection of the VMs can be reduced, since the memory capture device 304 can be a relatively low cost hardware device.

In some examples, the memory capture device 304 may be implemented as part of the BMC of the electronic device 300. In other examples, the memory capture device 304 is separate from the BMC. The memory capture device 304 is also separate from the processing resource 110.

The memory capture device 304 can also implement I/O virtualization such as SRIOV or SIOV, for example. The I/O virtualization performed by the memory capture device 304 provides virtual I/O devices 341 to 34N that can be used to establish communication channels with corresponding intrusion monitoring drivers 161 to 16N of the VMs 101 to 10N.

The I/O virtualization performed by the memory capture device 304 also provides a virtual I/O device 306 that can be used to establish a communication channel with an intrusion monitoring driver 308 in the inspector VM 302. The intrusion monitoring driver 308 is similar to the intrusion monitoring drivers 161 to 16N in the VMs 101 to 10N.

In an example where the I/O virtualization used is SIOV, the inspector VM 302 constitutes a privileged SIOV endpoint that is to be authenticated and authorized by the memory capture device 304. If the inspector VM 302 is successfully authenticated and authorized by the memory capture device 304 (such as based on use of credentials or keys), then the inspector VM 302 is a privileged VM that is able to gain access of the guest OS kernel information 151 to 15N of other VMs 101 to 10N for integrity inspection. The intrusion monitoring driver 308 in the inspector VM 302 is able to establish a privileged communication channel 314 with the virtual I/O device 306 in the memory capture device 304. An example of the privileged communication channel 314 is a privileged SIOV channel. A "privileged communication channel" can refer to a communication channel (e.g., a virtual communication channel between virtual entities) that has privileges not available to non-privileged communication channels, such as those established between the intrusion monitoring drivers 161 to 16N of the respective VMs 101 to 10N.

One such privilege is the ability to obtain addresses of the virtual memories 171 to 17N containing the guest OS kernel information 151 to 15N. Another privilege is the ability to obtain the guest OS kernel information 151 to 15N from the virtual memories 171 to 17N.

The inspector VM 302 includes a guest OS 310 and a kernel inspection program 312. The kernel inspection program 312 can perform tasks similar to those of the kernel inspection engine 130 of FIG. 1.

FIG. 4 is a flow diagram of a process performed by the inspector VM 302. The kernel inspection program 312 obtains (at 402) over the privileged communication channel 314 addresses of virtual memories (of the VMs 101 to 10N)

that are to be monitored for integrity inspection of guest OS kernel information. In FIG. 3, the addresses are provided from the VMs 101 to 10N to the virtual I/O devices 341 to 34N in the memory capture device 304, which in turn provide the addresses to the virtual I/O device 306 for communication over the privileged communication channel 314 to the inspector VM 302.

In some examples, the kernel inspection program 312 also obtains identities of the VMs 101 to 10N. An "identity" of a VM can refer to any unique identifier of the VM.

In some examples, the kernel inspection program 312 can issue requests (through the memory capture device 304) to respective VMs 101 to 10N for the addresses of the virtual memories 171 to 17N at which guest OS kernel information 151 to 15N are stored. Each request can include an identity of the respective VM, and the address of the virtual memory from which the guest OS kernel information is to be retrieved. In other examples, the respective intrusion monitoring drivers 161 to 16N of the VMs 101 to 10N can push, to the inspector VM 302, the identities of the VMs 101 to 10N and the addresses of the virtual memories 171 to 17N at which guest OS kernel information 151 to 15N are stored.

In response to receiving the addresses of the guest OS kernel information, the kernel inspection program 312 retrieves (at 404) the guest OS kernel information 15j from the virtual memory 17j of each respective VM 10j. More specifically, the kernel inspection program 312 can issue requests for the guest OS kernel information 151 to 15N at their respective addresses. The requests are issued over the privileged communication channel 314 to the memory capture device 304. These requests are passed by the virtual I/O device 306 in the memory capture device 304 to the respective virtual I/O devices 341 to 34N, which in turn forwards the requests to the VMs 101 to 10N to perform DMA access the virtual memories 171 to 17N. In response to the requests, the intrusion monitoring drivers 161 to 16N in the VMs 101 to 10N send the guest OS kernel information 151 to 15N to the respective virtual I/O devices 341 to 34N, which forward the guest OS kernel information 151 to 15N to the virtual I/O device 306 to send to the inspector VM 302.

The kernel inspection program 312 then applies (at 406) integrity inspection of each retrieved guest OS kernel information 15j. In response to detecting that the guest OS kernel information 15j has been compromised, the kernel inspection program 312 can initiate (at 408) a remediation action.

In examples where the VMs 101 to 10N are encrypted (and thus their guest OS kernel information 151 to 15N are encrypted), the inspector VM 302 can also be encrypted. In such examples, the memory controller 120 when retrieving encrypted guest OS kernel information can decrypt the encrypted guest OS kernel information. The decrypted guest OS kernel information is provided to the memory capture device 304. When the virtual I/O device 306 transfers the guest OS kernel information to the inspector VM 302, the memory controller 120 can encrypt the guest OS kernel information before transferring to the inspector VM 302. The key used to decrypt guest OS kernel information from each VM 10j (j=1 to N) can be different from the key used to encrypt the guest OS kernel information transferred to the inspector VM 302.

Figure 5:
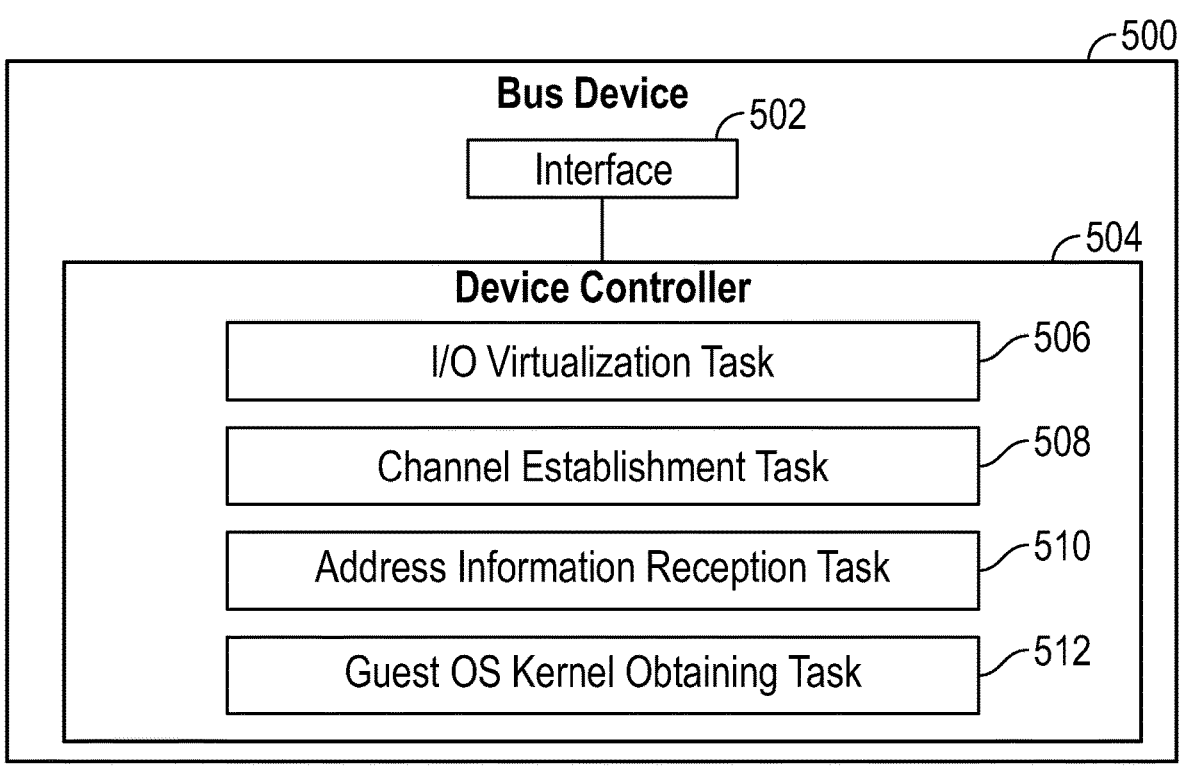
FIG. 5 is a block diagram of a bus device according to some examples.

FIG. 5 is a block diagram of a bus device 500 according to some examples of the present disclosure. The bus device 500 includes an interface 502 to a bus coupled to a processing resource (e.g., 110 in FIG. 1 or 3) that executes a VM. The interface 502 can be a bus interface to allow the bus device to communicate signals over the bus, such as a PCIe bus. The bus device 500 can be the kernel inspector device 118 of FIG. 1 or the memory capture device 304 of FIG. 3, for example.

The bus device 500 includes a device controller 504 to perform various tasks. The device controller 504 is implemented with hardware processing circuitry of the bus device 500, or as a combination of hardware processing circuitry and machine-readable instructions executable by the hardware processing circuitry.

The tasks that can be performed by the device controller 504 include an I/O virtualization task 506 to perform I/O virtualization to provide a virtualized instance of the bus device 500. The virtualized instance of the bus device 500 can include a virtual I/O device (e.g., 141 to 14N in FIG. 1) or a virtual I/O device (e.g., 341 to 34N in FIG. 3).

The tasks include a channel establishment task 508 to establish a channel between the virtualized instance of the bus device 500 and a guest OS of the VM. The channel can be a virtual communication channel established between virtual entities (such as between a virtual I/O device and an intrusion monitoring driver). In some examples, the virtualized instance of the bus device is coupled over the channel with the VM without interception or interposition by a hypervisor.

The tasks include an address information reception task 510 to receive, from the VM, address information relating to a portion of a virtual memory containing information associated with a guest OS kernel.

The tasks include a guest OS kernel information obtaining task 512 to obtain, for integrity inspection, the guest OS kernel information from the virtual memory based on the address information. In some examples, the device controller 504 includes a kernel inspection engine to perform the integrity inspection of the guest OS kernel information obtained from the virtual memory based on the address information. In further examples, the device controller 504 provides the guest OS kernel information obtained from the memory based on the address information to an inspector VM.

In some examples, the processing resource executes a plurality of VMs, and the device controller 504 performs the I/O virtualization to provide a plurality of virtualized instances of the bus device 500. Each virtualized instance of the plurality of virtualized instances interacts with a respective VM of the plurality of VMs to perform integrity inspection of a guest OS kernel in the respective VM.

In some examples, the device controller 504 receives a request from the inspector VM for retrieval of the information associated with the kernel from the virtual memory of the VM. In response to the request, the device controller 504 obtains the guest OS kernel information from the virtual memory, and provides, to the inspector VM, the guest OS kernel information.

In some examples, the inspector VM is a privileged I/O virtualization endpoint with a privilege to request the retrieval of the information associated with the kernel from the virtual memory. Another VM executed by the processing resource is without any privilege to request the retrieval of the information associated with the kernel from the virtual memory.

In some examples, the device controller 504 provides, to the inspector VM, an identity of the VM and the address information relating to the portion of the virtual memory containing the guest OS kernel information. The request from the inspector VM is based on the identity of the VM and the address information.

In some examples, the guest OS kernel information is provided in encrypted form to the inspector VM. In some examples, the guest OS kernel information obtained from the virtual memory is encrypted using a first encryption key. The device controller 504 receives a decrypted version of the guest OS kernel information obtained from the virtual memory after a decryption (e.g., by a memory controller such as 120 in FIG. 3) of the encrypted guest OS kernel information. In some examples, the device controller 504 transmits the decrypted version of the information associated with the kernel which causes the decrypted version of the information to be encrypted by a memory controller (e.g., 120 in FIG. 3) to produce the encrypted form of the guest OS kernel information that is provided to the inspector VM.

In some examples, the encrypting of the decrypted version of the guest OS kernel information uses a second encryption key different from the first encryption key.

Figure 6:
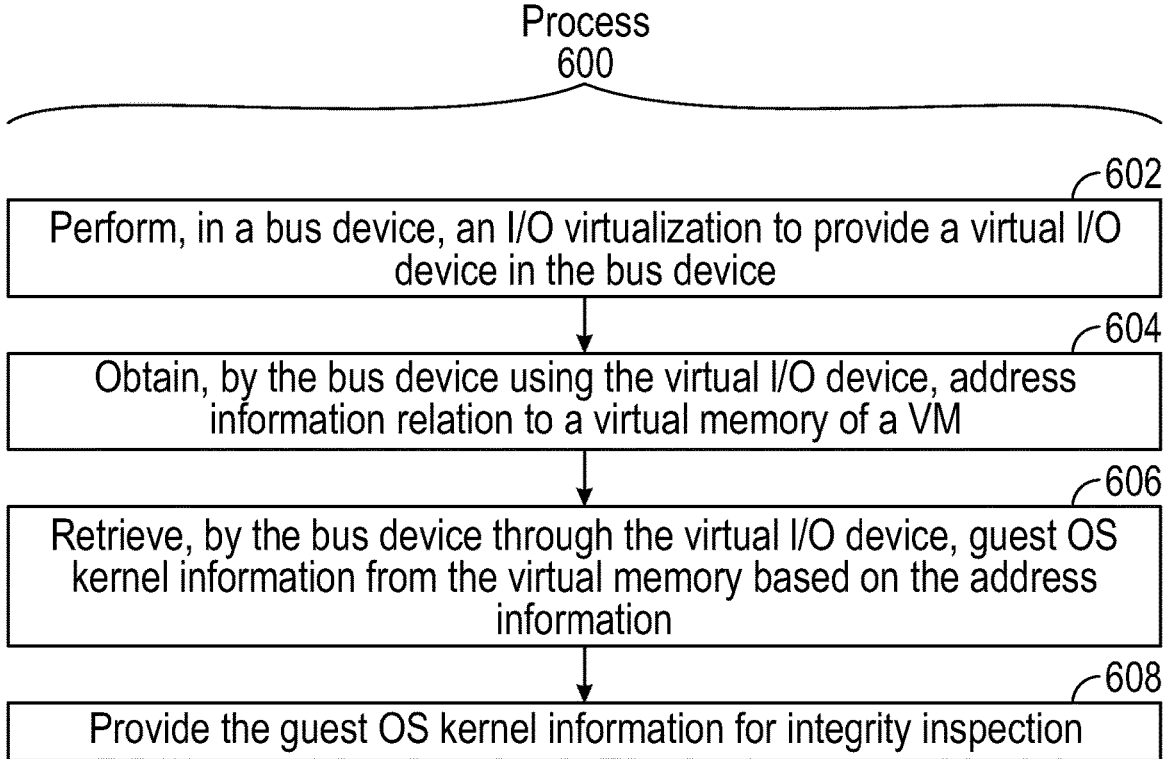
FIG. 6 is a flow diagram of a process according to some examples.

FIG. 6 is a flow diagram of a process 600 according to some examples. The process 600 includes performing (at 602), in a bus device, an I/O virtualization to provide a virtual I/O device in the bus device. The I/O virtualization can include SRIOV or SIOV. The bus device can be the kernel inspector device 118 of FIG. 1 or the memory capture device 304 of FIG. 3.

The process 600 includes obtaining (at 604), by the bus device using the virtual I/O device, address information relating to a virtual memory of a VM. The address information can be requested by the bus device or can be pushed to the bus device by an intrusion monitoring driver in the VM.

The process 600 includes retrieving (at 606), by the bus device through the virtual I/O device, guest OS kernel information from the virtual memory based on the address information. The bus device can retrieve the guest OS kernel information using DMA.

The process 600 includes providing (at 608) the guest OS kernel information for integrity inspection. The integrity inspection can be performed in the bus device or by an inspector VM. In some examples, the integrity inspection of the guest OS kernel information of the VM can be enabled by installing or enabling an intrusion monitoring driver in the VM.

Figure 7:
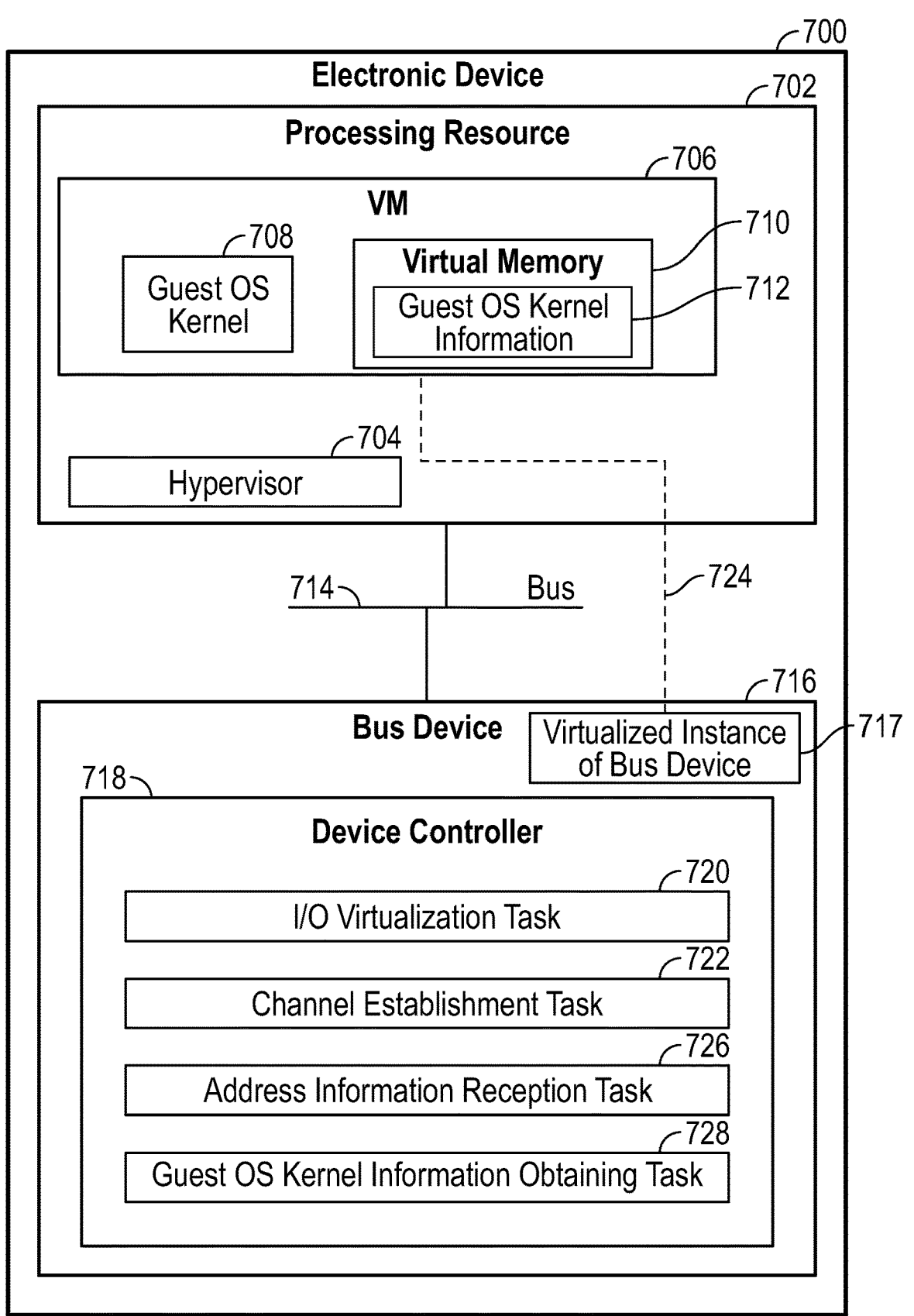
FIG. 7 is a block diagram of an electronic device according to some examples.

FIG. 7 is a block diagram of an electronic device 700 according to some examples of the present disclosure. The electronic device 700 includes a processing resource 702 to execute a hypervisor 704 and a VM 706 that includes a guest OS kernel 708 and a virtual memory 710 storing guest OS kernel information 712 associated with the guest OS kernel 708.

The electronic device 700 includes a bus 714, such as a PCIe bus or another type of bus. The electronic device 700 includes a bus device 716 connected to the bus 714. The bus device 716 includes a device controller 718 to perform various tasks.

The tasks of the device controller 718 include an I/O virtualization task 720 to perform I/O virtualization to provide a virtualized instance 717 of the bus device 716. The virtualized instance 717 of the bus device 716 can be a virtual I/O device (e.g., 141 to 14N in FIG. 1 or 341 to 34N in FIG. 3) provided by SRIOV or SIOV, for example.

The tasks of the device controller 718 include a channel establishment task 722 to establish a channel 724 between the virtualized instance 717 of the bus device 716 and the VM 706. The virtualized instance 717 of the bus device 716 is coupled over the channel 724 with the VM 706 without interception or interposition by the hypervisor 704.

The tasks of the device controller 718 include an address information reception task 726 to receive, from the VM 706, address information relating to a portion of the virtual memory 710 containing the guest OS kernel information 712.

The tasks of the device controller 718 include a guest OS kernel information obtaining task 728 to obtain, for integrity inspection, the guest OS kernel information from the virtual memory using DMA based on the address information. The integrity inspection can be performed by the bus device 716 or by an inspector VM.

A storage medium to store machine-readable instructions and data can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A bus device comprising:
an interface to a bus coupled to a processing resource that executes a virtual machine (VM); and
a device controller to:
perform input/output (I/O) virtualization to provide a virtualized instance of the bus device;
establish a channel between the virtualized instance of the bus device and a quest operating system (OS) of the VM;
receive, from the VM, address information relating to a portion of a memory containing information associated with a kernel of the quest OS; and
obtain, for integrity inspection, the information associated with the kernel from the memory based on the address information;
provide the information associated with the kernel obtained from the memory based on the address information to an inspector VM executed by the processing resource or another processing resource;
receive a request from the inspector VM for retrieval of the information associated with the kernel from a virtual memory of the VM; and
in response to the request, obtain the information associated with the kernel from the virtual memory, and provide, to the inspector VM, the information associated with the kernel, and
wherein the inspector VM is a privileged I/O virtualization endpoint with a privilege to request the retrieval of the information associated with the kernel from the virtual memory, and wherein another VM executed by the processing resource is without any privilege to request the retrieval of the information associated with the kernel from the virtual memory.

2. The bus device of claim 1, wherein the virtualized instance of the bus device is coupled over the channel with the VM without interception or interposition by a hypervisor.

3. The bus device of claim 1, wherein the I/O virtualization comprises Single Root I/O Virtualization (SRIOV) or Scalable I/O Virtualization (SIOV).

4. The bus device of claim 1, wherein the processing resource executes a plurality of VMs, and wherein the device controller is to perform the I/O virtualization to provide a plurality of virtualized instances of the bus device, each virtualized instance of the plurality of virtualized instances to interact with a respective VM of the plurality of VMs to perform integrity inspection of a kernel in the respective VM.

5. The bus device of claim 1, wherein the device controller is to perform the integrity inspection of the information associated with the kernel obtained from the memory based on the address information.

6. The bus device of claim 1, wherein the address information from the VM is provided by the VM upon booting of the VM.

7. The bus device of claim 1, wherein the virtualized instance of the bus device is to obtain the information associated with the kernel by direct memory access (DMA) from the memory.

8. A bus device comprising:
an interface to a bus coupled to a processing resource that executes a virtual machine (VM); and
a device controller to:
perform input/output (I/O) virtualization to provide a virtualized instance of the bus device;
establish a channel between the virtualized instance of the bus device and a guest operating system (OS) of the VM;
receive, from the VM, address information relating to a portion of a memory containing information associated with a kernel of the quest OS; and
obtain, for integrity inspection, the information associated with the kernel from the memory based on the address information;
provide the information associated with the kernel obtained from the memory based on the address information to an inspector VM executed by the processing resource or another processing resource;
receive a request from the inspector VM for retrieval of the information associated with the kernel from a virtual memory of the VM;

in response to the request, obtain the information associated with the kernel from the virtual memory, and provide, to the inspector VM, the information associated with the kernel, and provide, to the inspector VM, an identity of the VM and the address information relating to the portion of the memory containing the information associated with the kernel of the guest OS, wherein the request from the inspector VM is based on the identity of the VM and the address information.

9. The bus device of claim 8, wherein the virtualized instance of the bus device is coupled over the channel with the VM without interception or interposition by a hypervisor.

10. The bus device of claim 8, wherein the I/O virtualization comprises Single Root I/O Virtualization (SRIOV) or Scalable I/O Virtualization (SIOV).

11. The bus device of claim 8, wherein the processing resource executes a plurality of VMs, and wherein the device controller is to perform the I/O virtualization to provide a plurality of virtualized instances of the bus device, each virtualized instance of the plurality of virtualized instances to interact with a respective VM of the plurality of VMs to perform integrity inspection of a kernel in the respective VM.

12. The bus device of claim 8, wherein the device controller is to perform the integrity inspection of the information associated with the kernel obtained from the memory based on the address information.

13. A bus device comprising:

an interface to a bus coupled to a processing resource that executes a virtual machine (VM); and a device controller to:

perform input/output (I/O) virtualization to provide a virtualized instance of the bus device;

establish a channel between the virtualized instance of the bus device and a guest operating system (OS) of the VM;

receive, from the VM, address information relating to a portion of a memory containing information associated with a kernel of the quest OS; and obtain, for integrity inspection, the information associated with the kernel from the memory based on the address information, wherein the device controller is to provide the information associated with the kernel obtained from the memory based on the address information to an inspector VM executed by the processing resource or another processing resource, wherein the information associated with the kernel is provided in encrypted form to the inspector VM, wherein the information associated with the kernel obtained from the memory is encrypted using a first encryption key, and wherein the device controller is to:

receive a decrypted version of the information associated with the kernel obtained from the virtual memory after a decryption of the encrypted information associated with the kernel; and transmit the decrypted version of the information associated with the kernel wherein the decrypted version of the information is encrypted by a memory controller to produce the encrypted form of the information associated with the kernel that is provided to the inspector VM.

14. The bus device of claim 13, wherein the encrypting of the decrypted version of the information associated with the kernel uses a second encryption key different from the first encryption key.

15. The bus device of claim 13, wherein the virtualized instance of the bus device is coupled over the channel with the VM without interception or interposition by a hypervisor.

16. The bus device of claim 13, wherein the I/O virtualization comprises Single Root I/O Virtualization (SRIOV) or Scalable I/O Virtualization (SIOV).

17. The bus device of claim 13, wherein the processing resource executes a plurality of VMs, and wherein the device controller is to perform the I/O virtualization to provide a plurality of virtualized instances of the bus device, each virtualized instance of the plurality of virtualized instances to interact with a respective VM of the plurality of VMs to perform integrity inspection of a kernel in the respective VM.

18. The bus device of claim 13, wherein the device controller is to perform the integrity inspection of the information associated with the kernel obtained from the memory based on the address information.

\* \* \* \* \*